United States Patent
Murman et al.

[15] 3,674,053
[45] July 4, 1972

[54] REPLACEABLE BLADDER PULSATION DAMPENER

[72] Inventors: Fernando Murman, Palos Verdes Peninsula; George E. Lewis, Arcadia, both of Calif.

[73] Assignee: Hydril Company, Los Angeles, Calif.

[22] Filed: June 12, 1970

[21] Appl. No.: 45,647

[52] U.S. Cl. ............................................. 138/30
[51] Int. Cl. ............................................. F16l 55/04
[58] Field of Search ............................... 138/26, 30

[56] References Cited

UNITED STATES PATENTS

| 3,428,091 | 2/1969 | Sugimura | 138/30 |
| 3,333,604 | 8/1967 | Birdwell | 138/30 |
| 3,540,482 | 11/1970 | Fulmer | 138/30 |
| 2,421,076 | 5/1947 | Linton | 138/30 |
| 3,509,916 | 5/1970 | Mercier | 138/30 |
| 2,740,259 | 4/1956 | Westlund | 138/30 X |

*Primary Examiner*—Herbert F. Ross
*Attorney*—White, Haefliger and Bachand

[57] ABSTRACT

A pulsation dampener comprises
 a. a vessel having a hollow interior and a main inlet for first fluid subjected to pulsation,
 b. a bladder extending within the vessel interior dividing same into a first zone adapted to receive said first fluid and a second zone adapted to contain second fluid under pressure, and
 c. the vessel having an inlet for said second fluid and which is located to be overlapped by said bladder for sealing off communication between said inlet and said second zone in response to first fluid pressure exertion against the bladder.

11 Claims, 3 Drawing Figures

PATENTED JUL 4 1972 3,674,053

INVENTORS.
FERNANDO MURMAN
GEORGE E. LEWIS
By White, Haefliger & Bachand
ATTORNEYS.

3,674,053

REPLACEABLE BLADDER PULSATION DAMPENER

BACKGROUND OF THE INVENTION

This invention relates generally to pulsation dampeners, and more particularly concerns the construction of dampener assemblies facilitating replacement of flexible bladders used therein.

Pulsation dampeners are typically connected in supply lines conveying fluid subjected to pulsation. For example, a reciprocating piston type pump may deliver hydraulic pressure, with pulsations created by piston reciprocation, to an hydraulically powered tool. Such dampeners typically incorporate flexible bladders separating a compressible fluid zone from the fluid subjected to pulsation, in order to dampen the pulsations as the bladder moves back and forth in the dampener chamber or vessel. It is found that bladder wear occurs due to constant stressing and straining accompanying flexing, necessitating replacement at intervals; however, while bladder removability is not difficult to provide, the problem of providing easily usable and highly reliable means to re-introduce compressible fluid behind the newly installed bladder and for positively blocking leakage of the fluid during extended use of the dampener in the field, is not easily solved. In this regard, constant vibration of conventional dampeners during use thereof tends to promote leakage of compressible fluid through fill port valves. Accordingly, there is need for a simple, highly reliable pulsation dampener that will overcome the above described problems as well as others encountered in use.

SUMMARY OF THE INVENTION

It is a major object of the invention to provide a pulsation dampener construction facilitating bladder replacement and enabling easy re-introduction of compressible fluid behind the bladder through use of the bladder in such a way or to seal off the fluid entrance porting during normal usage of the dampener, and also to pass the compressible fluid during filling thereof into the vessel after bladder replacement. In this regard, the fill porting and associated structure may have construction to promote such multiple functioning of the bladder.

Basically, the invention is embodied in a vessel having a hollow interior and a main inlet for first fluid subjected to pulsation; a bladder extending within the vessel interior dividing same into a first zone adapted to receive such fluid, and a second zone adapted to contain second fluid under pressure; and the vessel having an inlet for in-filling of such second fluid which is located to be overlapped by the bladder for sealing off communication between the inlet and the second zone in response to first fluid pressure exertion against the bladder as during normal use thereof. As will be seen the bladder may be urged by the pressure of such second fluid into doubly overlapping relation with the inlet at times when the dampener is not receiving first fluid pressure, whereby there is positive sealing of that inlet under all conditions.

Another important aspect of the invention concerns the provision of an insert received in a bore in the vessel wall and containing ducting communicating with the inlet to pass the second fluid thereto, the insert presenting bladder supporting surface extent proximate the inlet. Further, the insert may include a bladder supporting head which is received in a counterbore in the vessel wall at the inner side thereof to shoulder against the wall and block outward displacement of the insert, for absolute safety. In addition, a plug may be received in the bore outwardly of the insert to act as a secondary means to positively block escape of the second fluid from the second zone.

Additional objects and advantages include the provision of a bladder neck having removable attachment to the vessel; the provision of a removable plate which forms part of the vessel, defines the main inlet for the first pressure fluid and also retains the bladder neck removably attached to the vessel; and the provision of removable and replaceable means, as for example a weld, blocking unthreading of the plate from the vessel neck.

These and other objects and advantages of the invention, as well as the details of an illustrative embodiment, will be more fully understood from the following specification and drawings, in which:

DRAWING DESCRIPTION

DETAILED DESCRIPTION

Figure 1:
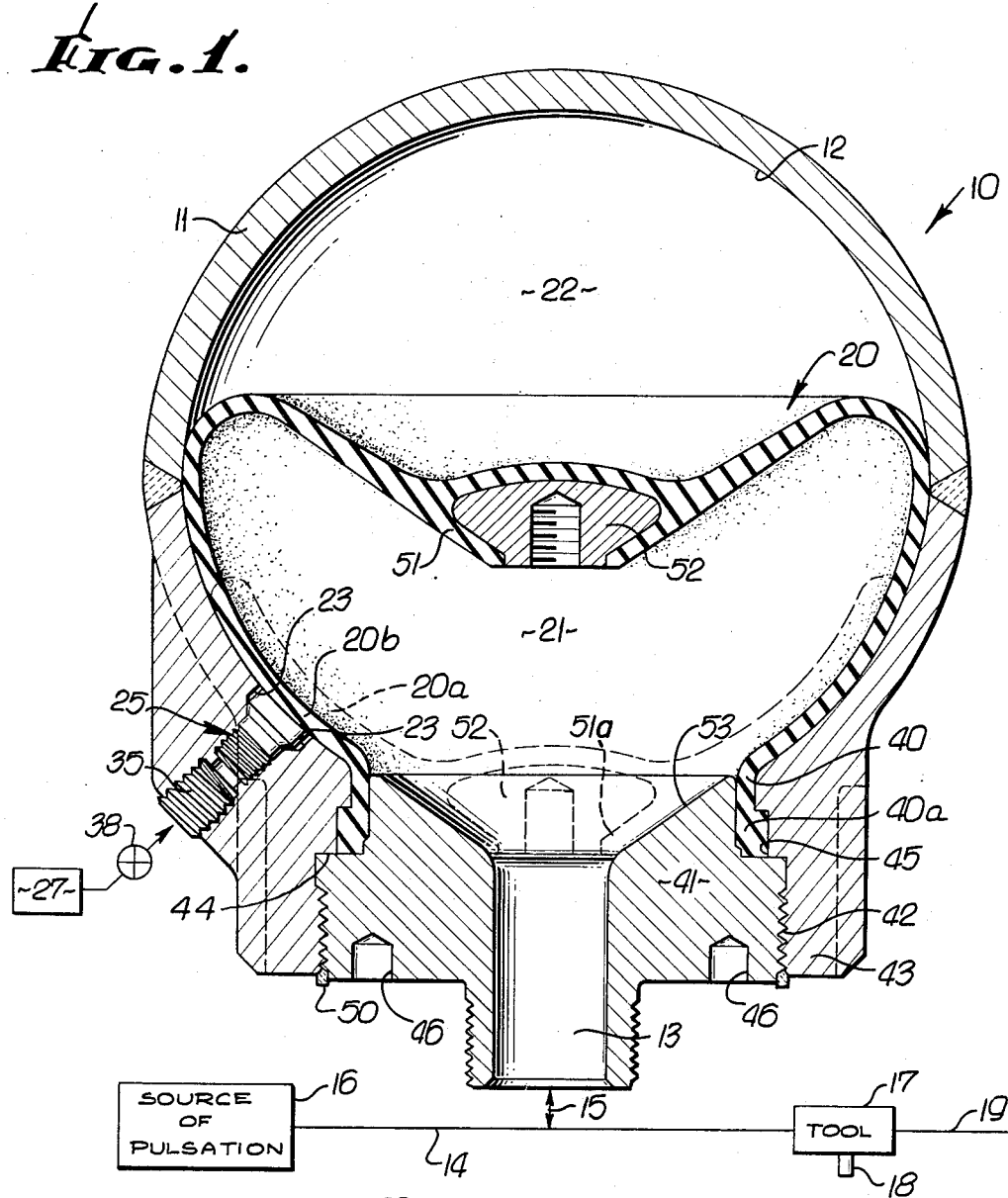
FIG. 1 is an elevation taken in section through a pulsation dampener incorporating the invention.
Figure 3:
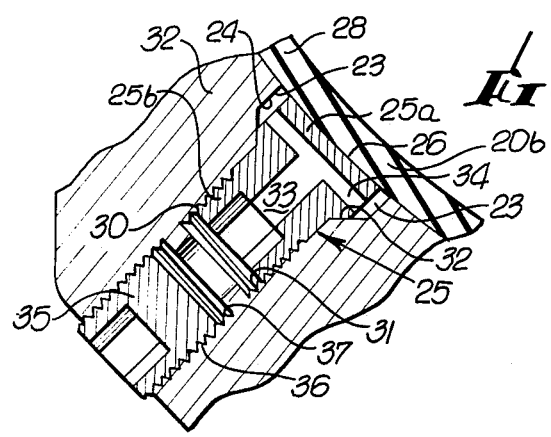
FIG. 3 is an enlarged section taken through the compressible fluid inlet structure of the FIG. 1 dampener.
Figure 2:
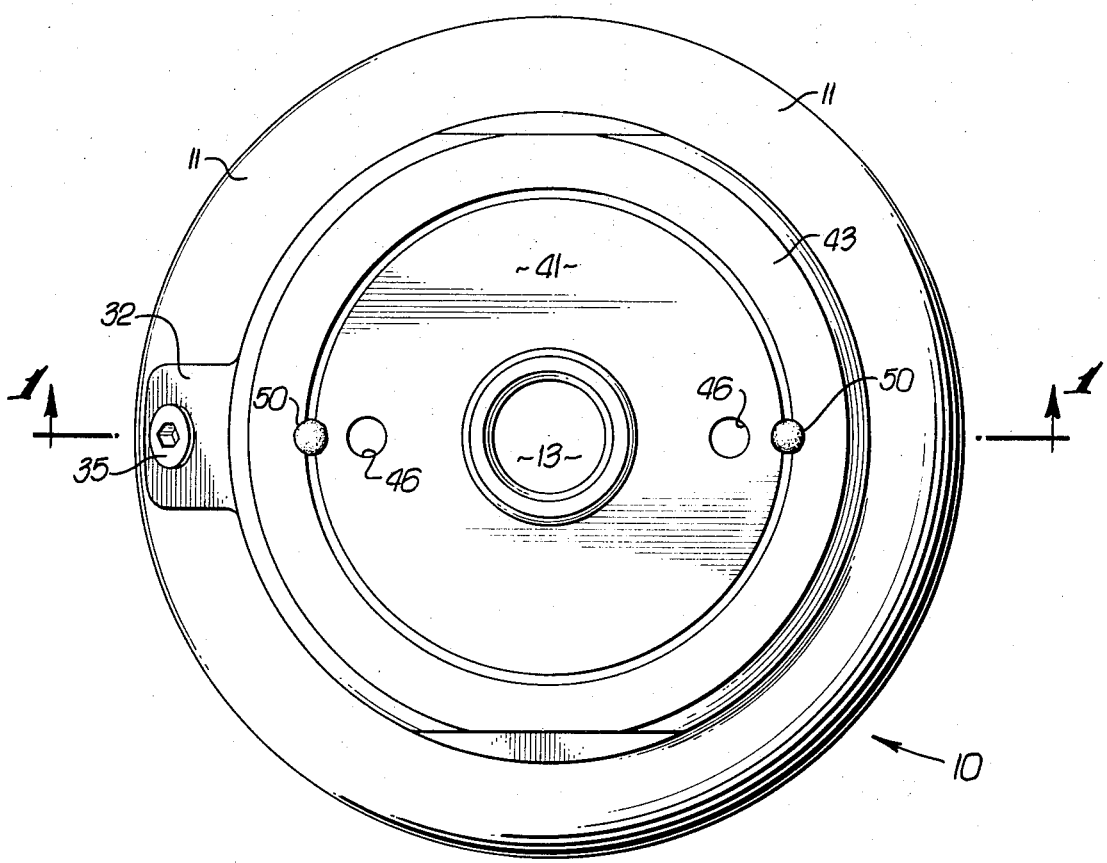
FIG. 2 is an entrance end view of the FIG. 1 dampener.

Referring to FIG. 1, the dampener 10 includes a vessel 11, which may be generally spherical as shown, having a hollow interior 12 and a main inlet 13 for first fluid subjected to pulsation. Merely as illustrative, the main inlet or entrance may communicate at 15 with a pressure line 14 delivering pressurized fluid from a source of pulsations such as a compressor 16 to a pressurized fluid actuated tool 17. The latter operates a driver 18 and exhausts spent fluid at 19 to a reservoir 19a. The tool 17 may also cause pulsations which must be dampened to reduce wear and maintenance of the fluid system.

A flexible bladder 20 extends within the vessel interior 12 and divides same into a first zone 21 adapted to receive the first fluid, and a second zone 22 adapted to contain compressible second fluid under pressure. Accordingly, as the first fluid pulsations are transmitted to zone 21, the bladder flexes toward and away from zone 22 to absorb and dampen the pulsations in line 14, the compressible fluid cushioning the pulsations as transmitted via the bladder to zone 22.

The vessel 10 also has an auxiliary inlet for the second fluid and which is located to be overlapped by the bladder for sealing off communication between that inlet and the second zone 22 in response to first fluid pressure exertion against the bladder during operation as described. In the illustrated example, the auxiliary inlet is shown at 23 as formed between a counterbore 24 and the head 25a of an insert 25, whereby the inlet 23 is narrowly annular. The head 25a provides bladder supporting surface extent at 26 so that the bladder is not urged into the inlet 23 to any significant extent by the fluid pressure within the vessel, whereby bladder wear at the inlet location is not of significance; at the same time, the total fluid passing cross-sectional area of the inlet 23 is sufficient to allow rapid filling of second fluid, from a source such as at 27, into zone 22 via a path 28 between the bladder and the vessel inner wall, as after bladder replacement.

The insert 25 also includes a shank 25b which has threaded connection at 30 with the bore 31 in vessel wall portion 32. In this regard, the insert is threaded into the bore 31 from the inside of the vessel, and until the insert head 25a seats against step shoulder 32, blocking further outward displacement of the insert, for safety. The insert contains endwise ducting 33 and transverse ducting 34 for passing second fluid to the inlet 23 and thence to the interior zone 22, as described. A solid plug 35 may be threaded at 36 into the bore 37, in a radially inward direction, for additional safety. When it is desired to connect source 27 into filling relation with the zone 22, and vie fill valve 38, plug 35 may be removed.

FIG. 1 shows the bladder 20 as including a neck 40 removably attached to the vessel. For that purpose, the vessel may include a removable member such as a plate 41 having threaded connection at 42 with the vessel neck 43 so as to retain the bladder neck in attached position. The plate shoulders at 44 against the vessel neck when the enlarged portion 40a of the bladder neck fills and is retained in a counterbore 45 in the vessel neck. Openings 46 in the plate permit wrench attachment to the latter for removal and attachment purposes. Note that the plate is sufficiently large as to permit easily replacement of the bladder through the vessel neck, and also to permit threading of the insert 25 into the bore 31, from within the vessel.

A small weld 50 bridging the plate 41 and neck 43 normally blocks unscrewing of the plate 41 from the vessel; however, when bladder replacement is desired, the weld is filed or ground off to allow such unscrewing. The weld may easily be re-created after bladder replacement.

Broken line 20a indicates the position of the bladder doubly overlapping the inlet 23 when the inlet 13 does not receive fluid pressure from line 14. At that time, the central neck region 51 of the bladder carrying a metal insert 52 is urged by pressure in zone 22 into position 51a to seat against taper 53 and plug the inlet 13. Pressure in zone 22 then urges the bladder overlapping sections 20a and 20b tightly toward the inlet 23, sealing that opening should plug 35 be removed.

We claim:

1. In a pulsation dampener, the combination, comprising
   a. a vessel having a hollow interior and a main inlet for first fluid subjected to pulsation,
   b. a bladder extending within the vessel interior dividing same into a first zone adapted to receive said first fluid and a second zone adapted to contain second fluid under pressure, the bladder having a body portion adapted to flex back and forth to dampen said pulsation,
   c. the vessel having an auxiliary inlet for said second fluid and which remains closely overlapped by a side portion of said bladder during said body portion flexing for sealing off communication between said auxiliary inlet and said second zone in response to first fluid pressure exertion against the bladder,
   d. the bladder having a neck, the vessel including a removable plate forming said main inlet and retaining said bladder neck removably attached to the vessel, and the vessel having a neck removably receiving said plate and bladder neck.

2. The combination of claim 1 wherein the vessel has a wall containing a bore, and including an insert received in said bore and containing ducting communicating with said auxiliary inlet to pass said second fluid thereto, the insert presenting bladder supporting surface extent proximate said auxiliary inlet.

3. The combination of claim 2 wherein said bore includes a counterbore at the inner side of said wall, the insert having a head received in said counterbore to resist pressure induced outward displacement of the insert.

4. The combination of claim 3 wherein said auxiliary inlet is formed between said head and said counterbore.

5. The combination of claim 3 wherein the insert has a shank with threaded connection to the vessel at said bore, and outwardly of said head.

6. The combination of claim 5 including a plug received in said bore outwardly of said insert.

7. The combination of claim 1 wherein the plate and vessel neck have threaded connection, and including removable means blocking unthreading of said connection.

8. The combination of claim 7 wherein said means comprises a removable weld.

9. The combination of claim 1 including a pneumatic tool having an air pressure delivery line communicating with said main inlet.

10. In a pulsation dampener, the combination, comprising
    a. a vessel having a hollow interior and a main inlet for first fluid subjected to pulsation,
    b. a bladder extending within the vessel interior dividing same into a first zone adapted to receive said first fluid and a second zone containing second fluid under pressure, the bladder having a body portion adapted to flex back and forth to dampen said pulsation, and
    c. the vessel having an auxiliary inlet for said second fluid and which remains closely overlapped by a side portion of said bladder during said body portion flexing for sealing off communication between said auxiliary inlet and said second zone in response to first fluid pressure exertion against the bladder,
    d. said second fluid in said second zone acting to urge the bladder into a configuration characterized by double overlapping of said auxiliary inlet, 11. The combination of claim 10 wherein the bladder has a neck region, and including an insert carried by the bladder to plug said neck region at times when said bladder doubly overlaps said auxiliary inlet.

* * * * *